United States Patent
Tadiparti

(10) Patent No.: US 11,494,765 B2
(45) Date of Patent: Nov. 8, 2022

(54) SECURE REMOTE TRANSACTION SYSTEM USING MOBILE DEVICES

(71) Applicant: VISA International Service Association, San Francisco, CA (US)

(72) Inventor: Srinivas Tadiparti, Bellevue, WA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 194 days.

(21) Appl. No.: 15/593,233

(22) Filed: May 11, 2017

(65) Prior Publication Data

US 2018/0330371 A1 Nov. 15, 2018

(51) Int. Cl.
*G06Q 20/40* (2012.01)
*G06Q 20/32* (2012.01)
*G06Q 20/38* (2012.01)

(52) U.S. Cl.
CPC ......... *G06Q 20/401* (2013.01); *G06Q 20/322* (2013.01); *G06Q 20/38215* (2013.01)

(58) Field of Classification Search
USPC .................................................. 705/21, 44
See application file for complete search history.

(56) References Cited

U.S. PATENT DOCUMENTS

| | | | |
|---|---|---|---|
| 2,747,363 A | 5/1956 | Cohen et al. | |
| 5,280,527 A | 1/1994 | Gullman | |
| 5,613,012 A | 3/1997 | Hoffman | |
| 5,781,438 A | 7/1998 | Lee | |
| 5,832,089 A | * 11/1998 | Kravitz | G06Q 20/02 |
| | | | 705/69 |
| 5,883,810 A | 3/1999 | Franklin | |
| 5,930,767 A | 7/1999 | Reber | |
| 5,953,710 A | 9/1999 | Fleming | |

(Continued)

FOREIGN PATENT DOCUMENTS

| | | |
|---|---|---|
| EP | 1028401 A2 | 8/2000 |
| EP | 2156397 A1 | 2/2010 |

(Continued)

OTHER PUBLICATIONS

"Secure Communication for Internet Payment in Heterogeneous Networks" IEEE (Year: 2010).*

(Continued)

*Primary Examiner* — Bruce I Ebersman
(74) *Attorney, Agent, or Firm* — Kilpatrick Townsend & Stockton LLP

(57) ABSTRACT

Described herein is a secure system and methods for enabling a user to remotely generate a token to be used in a transaction. In the disclosure, the user may provide a mobile device identifier to a resource provider to complete a transaction. A service provider, upon receiving the mobile device identifier, may generate a message to be transmitted to a mobile device associated with that mobile device identifier that includes details of the transaction to be complete. Upon receiving the message, the user may be asked to elect a token service installed on the mobile device with which the transaction should be completed. This token service may be used to authenticate the user and subsequently generate or provide the requested token. The service provider computer may then use the generated token to complete the transaction.

16 Claims, 6 Drawing Sheets

(56) References Cited

U.S. PATENT DOCUMENTS

| | | |
|---|---|---|
| 5,956,699 A | 9/1999 | Wong |
| 6,000,832 A | 12/1999 | Franklin |
| 6,014,635 A | 1/2000 | Harris |
| 6,014,646 A * | 1/2000 | Vallee ............... G06Q 20/3678 |
| | | 705/69 |
| 6,044,360 A | 3/2000 | Picciallo |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem Ur |
| 6,453,301 B1 | 9/2002 | Niwa |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,891,953 B1 | 5/2005 | DeMello |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,181,017 B1 * | 2/2007 | Nagel .................. H04L 9/0841 |
| | | 380/282 |
| 7,194,437 B1 | 3/2007 | Britto |
| 7,209,561 B1 | 4/2007 | Shankar et al. |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,599,856 B2 * | 10/2009 | Agrawal ............ G06Q 20/3821 |
| | | 705/76 |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,132,723 B2 | 3/2012 | Serve |
| 8,171,525 B1 | 5/2012 | Pelly |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,528,067 B2 | 9/2013 | Hurry et al. |
| 8,533,116 B2 | 9/2013 | Davis et al. |
| 8,533,860 B1 | 9/2013 | Grecia |

(56) References Cited

U.S. PATENT DOCUMENTS

| | | |
|---|---|---|
| 8,538,845 B2 | 9/2013 | Liberty |
| 8,555,079 B2 | 10/2013 | Shablygin |
| 8,566,168 B1 | 10/2013 | Bierbaum |
| 8,566,247 B1* | 10/2013 | Nagel .................. H04L 63/045 380/270 |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,810 B1* | 11/2013 | Dalit .................. G06F 21/32 705/1.1 |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,751,642 B2 | 6/2014 | Vargas |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,646,303 B2 | 5/2017 | Karpenko |
| 9,680,942 B2 | 6/2017 | Dimmick |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0236632 A1 | 11/2004 | Maritzen |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0043651 A1* | 2/2007 | Xiao .................. G06Q 40/04 705/37 |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0301461 A1* | 12/2008 | Coulier .................. G06F 21/34 713/184 |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0210712 A1* | 8/2009 | Fort .................. H04L 63/1441 713/175 |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |

(56) References Cited

U.S. PATENT DOCUMENTS

| | | |
|---|---|---|
| 2010/0223186 A1 | 9/2010 | Hogan |
| 2010/0228668 A1 | 9/2010 | Hogan |
| 2010/0235284 A1 | 9/2010 | Moore |
| 2010/0257102 A1* | 10/2010 | Perlman ............ G06Q 30/06 705/44 |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143754 A1 | 6/2012 | Patel |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0290376 A1* | 11/2012 | Dryer ............ G06Q 20/3278 705/14.23 |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159021 A1* | 6/2013 | Felsher ............ G16H 10/60 705/3 |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191227 A1 | 7/2013 | Pasa et al. |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226802 A1 | 8/2013 | Hammad |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1* | 10/2013 | Paraskeva ............ G06Q 20/32 705/71 |
| 2013/0282502 A1 | 10/2013 | Jooste |

(56) References Cited

U.S. PATENT DOCUMENTS

| | | |
|---|---|---|
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0164254 A1 | 6/2014 | Dimmick |
| 2014/0188586 A1 | 7/2014 | Carpenter et al. |
| 2014/0249945 A1 | 9/2014 | Gauthier |
| 2014/0294701 A1 | 10/2014 | Dai et al. |
| 2014/0297534 A1 | 10/2014 | Patterson |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0066768 A1* | 3/2015 | Williamson ......... G06Q 20/405 705/44 |
| 2015/0081544 A1 | 3/2015 | Wong et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0278799 A1 | 10/2015 | Palanisamy |
| 2015/0287037 A1 | 10/2015 | Salmon |
| 2015/0312038 A1 | 10/2015 | Palanisamy |
| 2015/0317613 A1* | 11/2015 | Clark ...................... G06Q 20/12 705/44 |
| 2015/0319158 A1 | 11/2015 | Kumnick |
| 2015/0324736 A1 | 11/2015 | Sheets |
| 2015/0332262 A1 | 11/2015 | Lingappa |
| 2015/0356560 A1 | 12/2015 | Shastry et al. |
| 2015/0363781 A1 | 12/2015 | Badenhorst |
| 2016/0019536 A1* | 1/2016 | Ortiz ................. G06Q 20/3227 705/67 |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0092874 A1 | 3/2016 | O'Regan |
| 2016/0098693 A1* | 4/2016 | Shauh ..................... G06Q 20/12 705/26.1 |
| 2016/0103675 A1 | 4/2016 | Aabye et al. |
| 2016/0119296 A1 | 4/2016 | Laxminarayanan et al. |
| 2016/0132878 A1 | 5/2016 | O'Regan |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0197725 A1 | 7/2016 | Hammad |
| 2016/0210628 A1 | 7/2016 | McGuire |
| 2016/0217461 A1 | 7/2016 | Gaddam |
| 2016/0218875 A1 | 7/2016 | Le Saint et al. |
| 2016/0224976 A1 | 8/2016 | Basu |
| 2016/0224977 A1 | 8/2016 | Sabba et al. |
| 2016/0232527 A1 | 8/2016 | Patterson |
| 2016/0239842 A1 | 8/2016 | Cash et al. |
| 2016/0269391 A1 | 9/2016 | Gaddam et al. |
| 2016/0283944 A1* | 9/2016 | Hubbard ............... G06Q 20/321 |
| 2016/0308995 A1 | 10/2016 | Youdale et al. |
| 2016/0335620 A1* | 11/2016 | Lyons ................. G06Q 20/322 |
| 2017/0011395 A1* | 1/2017 | Pillai .................. G06Q 20/3227 |
| 2017/0011440 A1 | 1/2017 | Shauh et al. |
| 2017/0046696 A1 | 2/2017 | Powell et al. |
| 2017/0076288 A1 | 3/2017 | Awasthi |
| 2017/0091770 A1* | 3/2017 | Bacastow ............ G06Q 20/356 |
| 2017/0103387 A1 | 4/2017 | Weber |
| 2017/0103388 A1* | 4/2017 | Pillai .................. G06Q 20/3829 |
| 2017/0109745 A1 | 4/2017 | Al-Bedaiwi |
| 2017/0148013 A1 | 5/2017 | Rajurkar |
| 2017/0148018 A1* | 5/2017 | Levin .................. G06Q 20/202 |
| 2017/0163617 A1 | 6/2017 | Narayan |
| 2017/0163629 A1 | 6/2017 | Law |
| 2017/0186001 A1 | 6/2017 | Reed et al. |
| 2017/0200156 A1 | 7/2017 | Karpenko |
| 2017/0200165 A1 | 7/2017 | Narayan |
| 2017/0201520 A1 | 7/2017 | Chandoor |
| 2017/0220818 A1 | 8/2017 | Nagasundaram et al. |
| 2017/0221054 A1 | 8/2017 | Flurscheim |
| 2017/0221056 A1 | 8/2017 | Karpenko |
| 2017/0228723 A1 | 8/2017 | Taylor |
| 2017/0228728 A1 | 8/2017 | Sullivan |
| 2017/0236113 A1 | 8/2017 | Chitalia |
| 2017/0293912 A1* | 10/2017 | Furche ............... G06Q 20/3825 |
| 2017/0293914 A1 | 10/2017 | Girish |
| 2017/0295155 A1 | 10/2017 | Wong et al. |
| 2017/0337549 A1 | 11/2017 | Wong |
| 2017/0364903 A1 | 12/2017 | Lopez |
| 2017/0364914 A1 | 12/2017 | Howard |
| 2017/0373852 A1 | 12/2017 | Cassin |
| 2018/0006821 A1 | 1/2018 | Kinagi |

(56) References Cited

U.S. PATENT DOCUMENTS

| | | |
|---|---|---|
| 2018/0075081 A1 | 3/2018 | Chipman |
| 2018/0247303 A1 | 8/2018 | Raj |
| 2018/0262334 A1 | 9/2018 | Hammad |
| 2018/0268399 A1 | 9/2018 | Spector |
| 2018/0268405 A1 | 9/2018 | Lopez |
| 2018/0285875 A1 | 10/2018 | Law |
| 2018/0324184 A1 | 11/2018 | Kaja |
| 2018/0324584 A1 | 11/2018 | Lopez |
| 2019/0020478 A1 | 1/2019 | Girish |
| 2019/0066069 A1 | 2/2019 | Faith |
| 2019/0147439 A1 | 5/2019 | Wang |
| 2019/0356489 A1 | 11/2019 | Palanismy |
| 2019/0384896 A1 | 12/2019 | Jones |
| 2019/0392431 A1 | 12/2019 | Chitalila |
| 2020/0267153 A1 | 8/2020 | Kang |

FOREIGN PATENT DOCUMENTS

| | | |
|---|---|---|
| EP | 2747363 | 6/2014 |
| RU | 2012127128 | 1/2014 |
| RU | 2644132 | 2/2018 |
| WO | 2000/014648 A1 | 3/2000 |
| WO | 2001035304 A1 | 5/2001 |
| WO | 2001035304 A9 | 5/2001 |
| WO | 2004/051585 A2 | 11/2003 |
| WO | 2004042536 A2 | 5/2004 |
| WO | 2005/001751 A1 | 6/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

"Leveraging Cellular Infrastructure to Improve Fraud Prevention" IEEE (Year: 2009).*

Author Unknown, "Apple Pay on the Web", https://stripe.com/docs/apple-pay/web, Visited Website May 11, 2017, 1 page.

PCT/US2018/027992 , "International Search Report and Written Opinion", dated Aug. 2, 2018, 14 pages.

EP18798679.9 , "Extended European Search Report", dated Apr. 9, 2020, 7 pages.

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

Dean, et al., U.S. Appl. No. 16/311,144 (unpublished), "Encryption Key Exchange Process Using Access Device," filed Dec. 18, 2018.

Application No. EP18798679.9 , Office Action, dated Sep. 6, 2021, 8 pages.

Application No. RU2019140274 , Office Action, dated Sep. 21, 2021, 18 pages.

* cited by examiner

SECURE REMOTE TRANSACTION SYSTEM USING MOBILE DEVICES

BACKGROUND

The proliferation of mobile devices and mobile applications is radically changing the way resources are provided to users. Resource providers now have greater access to users than ever while having minimal barriers to entry. This has allowed an increasing number of resource providers to flourish in the mobile device economy. While this increased number of resource providers may have had an overall beneficial impact on users (e.g., by pushing prices down and providing greater access to resources), it has also provided a number of opportunities for less scrupulous parties to profit at the expense of users. In some cases, less sophisticated resource providers have been able to enter the market, whom may be less capable of securing the transactions that they conduct. This may provide opportunities to unauthorized parties to gain access to sensitive information used in a transaction (e.g., via man-in-the-middle attacks) conducted with those resource providers. In some cases, the resource providers themselves may lack scruples and may sell sensitive information (e.g., credit card numbers) to unauthorized parties.

Embodiments of the invention address these and other problems, individually and collectively.

BRIEF SUMMARY

Embodiments of the invention are directed to secure systems and methods configured to enable a user to remotely generate a token to be used in a transaction. In some embodiments, the user may provide a mobile device identifier to a resource provider to complete a transaction. The mobile device identifier may then be conveyed to a service provider that performs at least a portion of the functionality described herein. The service provider, upon receiving the mobile device identifier, may generate a message to be transmitted to a mobile device associated with the mobile device identifier that includes details of the transaction to be complete. Upon receiving the message, the user may be asked to elect a token service installed on the mobile device with which the transaction should be completed. This token service may be used to authenticate the user and subsequently generate the requested token. The service provider computer may then use the generated token to complete the transaction.

Transactions conducted using embodiments of the disclosure may be relatively anonymous as resource providers may be provided no sensitive or identifying information. For example, a user may be given the ability to complete a "card-not-present" (e.g., online) transaction without providing his or her identity or any other sensitive information. Despite that, the described system ensures that liability is not increased for the entity with which the user is transacting (i.e., a resource provider).

One embodiment of the invention is directed to a method comprising receiving, at a service provider computer from a first device, a first transaction request comprising a second device identifier for a second device, transmitting, by the service provider computer a request to the second device using the second device identifier, for a first token, receiving, from second device and by the service provider computer, the first token, generating, by the service provider computer, an authorization request message comprising the first token in a first transaction, and transmitting the authorization request message comprising the first token to an authorization computer for authorization in the first transaction. The method may further comprise storing, by the service provider computer, the first token, receiving, by the service provider computer from the first device, a second transaction request, and transmitting the authorization request message comprising the first token or another access token related to the first token to the authorization computer for authorization of the second transaction.

Another embodiment of the invention is directed to a system comprising a processor, and a memory including instructions that, when executed with the processor, cause the system to, at least receive, from a first device, a first transaction request comprising a second device identifier for a second device, transmit a request to the second device using the second device identifier, for an access token, receive, from second device, the access token, generate an authorization request message comprising the access token in a first transaction, and transmit the authorization request message comprising the access token to an authorization computer for authorization in the first transaction. The instructions further cause the system to store, within the memory, the access token, receive, from the first device, a second transaction request, generate a second authorization request message comprising the access token in a second transaction, and transmit the second authorization request message comprising the access token to the authorization computer for authorization in the second transaction.

Yet another embodiment of the disclosure is directed to a mobile device comprising: a display, a processor, and a memory including instructions that, when executed with the processor, cause the mobile device to, at least: receive, from a service provider computer, transaction information related to a transaction initiated via a client device, identify a number of token applications installed on the mobile device capable of being used in the transaction, and display the identified number token applications on the display. The instructions may further cause the mobile device to receive an indication of an individual token application of the number of token applications to be used in the transaction, execute the token application in the memory, the token application being provided with the transaction information upon its execution; receive a token from the token application, and provide the token to the service provider computer.

These and other embodiments of the invention are described in further detail below.

DETAILED DESCRIPTION

Figure 1:
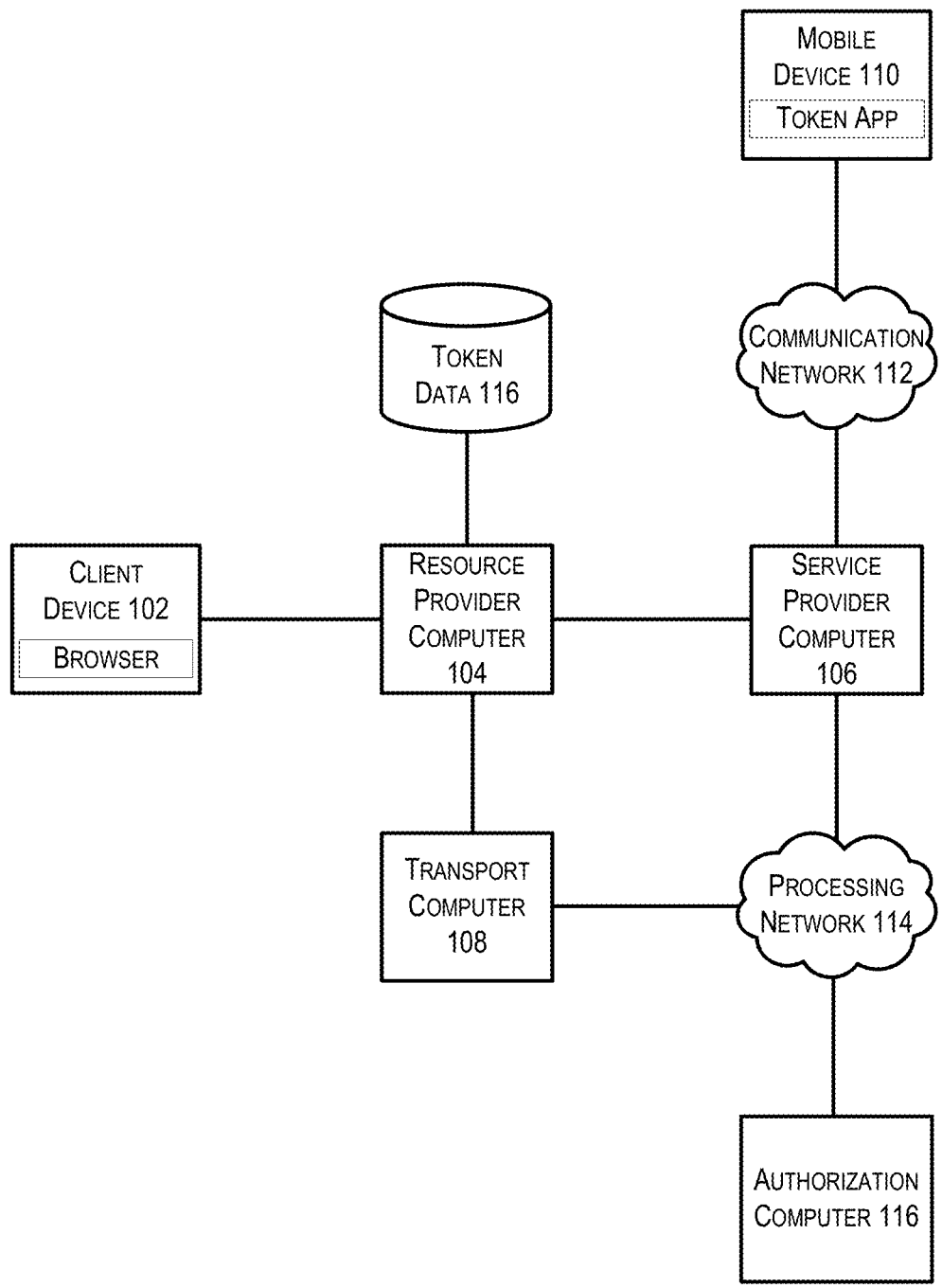
FIG. 1 depicts an illustrative example of a system in which a mobile device identifier may be used to complete a transaction with a resource provider in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present invention are directed to systems, methods, apparatuses, and computer readable media for enabling secure completion of a transaction using a mobile device. In the described system, a mobile device may be configured to enable a user to remotely generate or provide a token to be used in a transaction. In some embodiments, the user may provide a mobile device identifier to a resource provider with respect to a transaction to be conducted. The mobile device identifier may then be conveyed to a service provider that performs at least a portion of the functionality described herein by the resource provider. The service provider, upon receiving the mobile device identifier, may generate a message to be transmitted to a mobile device associated with the mobile device identifier that includes details of the transaction to be complete. Upon receiving the message, the user may be asked to elect a token service installed on the mobile device with which the transaction should be completed. This token service may be used to authenticate the user and subsequently generate or provide the requested token. The service provider computer may then use the generated or provided token to complete the transaction (e.g., by generating an authorization request message and submitting it to a transaction processing network).

By way of illustrative example, consider a scenario in which a user visits an electronic retailer and selects an item from that electronic retailer's catalog for purchase. In this example, the user may be presented with a checkout page to complete the purchase. Among the payment options, may be included an option to complete the transaction using the user's phone number. The use of this payment option may not require that the user provide any information other than a phone number. Once the user has provided his or her phone number, the electronic retailer may send that phone number to a service provider along with details of the transaction to be conducted. The service provider then communicates those details to the user's mobile phone via the provided phone number. At this point, the user is given the ability to confirm that the transaction should be completed as well as to select an electronic wallet application to be used to complete that transaction. The electronic wallet application may generate or provide a token to be used to pay for the transaction (e.g., an access token), which is then sent back to the service provider. In this illustrative example, the service provider can obtain authorization for the transaction and respond to the electronic retailer with whether or not the transaction is complete.

Prior to discussing embodiments of the invention, description of some terms may be helpful in understanding embodiments of the invention.

An "access device" may be any suitable device that provides access to a remote system. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer."

An "application" may refer to any set of computer-executable instructions configured to cause a processor to execute a function or access a resource. An application may be installed on, and executed from, a client device. Applications may be installed on a client device by a manufacturer of the client device or by another entity. An application installed on a mobile client device may be referred to as a mobile application.

An "authorization computer" may be any computing device operated by an entity that authorizes a request. Examples of such an entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the user.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements including one or more of: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction.

As will be described in detail below, in some embodiments the authorization request message may contain a device identifier such as a phone number of a device to be contacted. This device identifier may be present in the authorization request message in an account number data field instead of the account number in some embodiments. In other embodiments, the device identifier may be in a supplementary data field. In some embodiments, the authorization response message in some embodiments may include a token or a real account identifier, instead of the device identifier.

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the user.

A "client device" may be any electronic device capable of establishing a communication session with another electronic device (e.g., a resource provider) and transmitting/receiving data from that electronic device. A client device may have the ability to download and/or execute a set of computer-executable instructions (e.g., mobile applications). Client devices may include mobile communication devices as well as personal computers and thin-client devices.

A "computing device" may include any suitable device that can electronically process data. Examples of computing devices include desktop computers, mobile devices or mobile computing devices, television sets, etc.

A "mobile device" may include any suitable client device that can be easily transported by user. Examples of mobile devices are described in detail below.

A "resource provider" may be an entity that can provide a resource such as goods, services, information, and/or access. Examples of a resource provider include merchants, access devices, secure data access points, etc. A "merchant" may typically be an entity that engages in transactions and can sell goods or services, or provide access to goods or services.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers and/or resource providers. The server computer may comprise one or more computational apparatuses and may use any of a variety of computing structures, arrangements, and compilations for servicing the requests from one or more client computers or resource providers.

A "token" may be a substitute value for a credential. A token may be a string of numbers, letters, or any other suitable characters. Examples of tokens include payment tokens, access tokens, personal identification tokens, etc.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token). Tokenization may be used to enhance transaction efficiency, improve transaction security, increase service transparency, or to provide a method for third-party enablement.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "token domain" may indicate an area and/or circumstance in which a token can be used. Examples of the token domain may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service provider that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

"Token expiry date" may refer to the expiration date/time of the token. The token expiry date may be passed among the entities of the tokenization ecosystem during transaction processing to ensure interoperability. The token expiration date may be a numeric value (e.g. a 4-digit numeric value). In some embodiments, the token expiry date can be expressed as a time duration as measured from the time of issuance.

A "token provider" or "token service system" can include one or more computers that service payment tokens. In some embodiments, a token service system can facilitate requesting, determining (e.g., generating) and/or issuing tokens, as well as maintaining an established mapping of tokens to primary account numbers (PANs) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of payment transactions submitted using tokens by de-tokenizing the token to obtain the actual PAN. In some embodiments, a token service system may include a tokenization computer alone, or in combination with other computers such as a transaction processing network computer. Various entities of a tokenization ecosystem may assume the roles of the token service provider. For example, payment networks and issuers or their agents may become the token service provider by implementing the token services according to embodiments of the present invention.

A "transaction" may be any interaction or exchange between two or more entities. For example, a transaction may include a first electronic device (e.g., a client device) requesting resources from a second electronic device (e.g., a resource provider). In this example, the transaction is completed when the resources are either provided to the first electronic device or the transaction is declined.

A "transaction data" may be any information related to a transaction between two entities. Transaction information may include information related to a completed transaction or a transaction that has not yet been completed. In some embodiments, the transaction information may include any suitable information related to a context of the transaction. For example, the transaction information may include a time at which the transaction was conducted, a terminal at which the transaction was conducted, an amount for which the transaction was conducted, an indication of an entity with whom the transaction was conducted, or any other suitable transaction-related information.

FIG. 1 depicts an illustrative example of a system in which a mobile device identifier may be used to complete a transaction with a resource provider in accordance with at least some embodiments. In FIG. 1, a client device 102 is depicted as being in communication with a resource provider computer 104. The resource provider computer 104 is further depicted as being in communication with a service provider computer 106 as well as a transport computer 108 (e.g., an acquirer computer). The service provider computer 106 may be in communication with a number of mobile devices 110 via a communication network 112. The transport computer 108 and/or the service provider computer 106 may additionally be in communication with a processing network 114 configured to route authorization request messages generated for transactions. The authorization request message may be routed to an authorization computer 116 by the processing network 114.

In some embodiments, the client device may be any computing device capable of receiving user input and processing computer-executable instructions. The client device 102 may be configured to enable communication between a user and another electronic device (e.g., resource provider computer 104). In some embodiments, the client device 102 may have installed upon it a browser application configured to retrieve and display webpages. Some illustrative examples of a client device 102 may include a personal computer (PC), a laptop computer, a mobile device (e.g., the mobile device 110) or any other suitable electronic device.

In some embodiments, the resource provider computer 104 may be any computing device configured to manage access to a number of resources. In some embodiments, the resource provider computer 104 may represent a retailer or other provider of goods and/or services. For example, the resource provider computer 104 may be a server computing device affiliated with an online retail entity that maintains an electronic catalog of resources available for purchase. In some embodiments, the resource provider computers 104 may be accessed by a client device 102 via a browser application using an internet connection. For example, the resource provider computer 104 may maintain an online presence (e.g., a website) that may be accessed via an internet connection. In some embodiments, a resource provider 106 may be configured to receive a request for a particular resource from a client device, identify the resource within an electronic catalog, and serve a website associated with the requested resource to the client device 102. In some embodiments, the resource provider computer 104 may be configured to store token data 116 for use in completing transactions.

In some embodiments, the service provider computer 106 may be any computing device configured to execute at least a portion of the functionality described herein. In some embodiments, the service provider computer 106 may be configured to receive transaction requests from resource provider computers 104 that include mobile device identifiers and route those transaction requests to a particular mobile device 110. The service provider computer 106 may be further configured to receive token information from the mobile device 110 generated using a token application. The service provider computer 106 may store the token information and/or relay the token information to a resource provider from which the transaction request was received.

In some embodiments, the transport computer 108 may maintain an account associated with a resource provider computer 104 to which funds obtained in a transaction may be deposited.

In some embodiments, the mobile device 110 may be any portable computing device configured to perform at least some of the functions described herein. In some embodiments, the mobile device 110 may be a mobile communication device such as a smart phone, personal data assistant (PDA), cellular phone, or any other suitable portable device. The mobile device 110 may have installed upon it (e.g., stored within its memory) a number of applications or other sets of computer-executable instructions. In particular, the mobile device 110 may have installed upon it a token application that enables a user of the mobile device 110 to perform a transaction with a resource provider. To do this, the token application may be configured to receive information related to a transaction, obtain permission from a user of the mobile device 110, and generate a token to be used in completing the transaction. The mobile device 100 may also store a token that was previously provided by an external computer such as a token vault. The mobile device 110 may also include a secure memory such as secure element for storing a token or a real account credential.

In some embodiments, the communication network 112 may include any one or a combination of many different types of networks, such as cable networks, the Internet, wireless networks, cellular networks, and other private and/or public networks. In addition, the communication network 112 may comprise multiple different networks. For example, the mobile device 110 may utilize a 3G network to communicate with a wireless router, which may then route the communication over a public network (e.g., the Internet) to the service provider computer 104.

In some embodiments, the processing network 114 may be any network of computing devices configured to receive transaction requests and to route those received transaction requests to appropriate authorization entities. In some embodiments, the processing network 108 may be an electronic payment network (e.g., VisaNet). The processing network 108 may maintain transaction data, which includes historical transaction information associated with a plurality of users.

In some embodiments, the authorization computer 116 may be any computing device associated with an entity capable of authorizing transactions. In some embodiments, the authorization computer 116 may be a computing device operated by an issuer of a credit card used in the transaction. The authorization request message for a particular transaction may be routed to a particular authorization computer 116 based on a format of a token or account number used in the authorization request message.

By way of illustrating interactions between the various depicted components of the system, consider a scenario in which a user wishes to complete a transaction using the illustrated system. In this scenario, the user may use a personal computer (i.e., a client device 102, which may be an example of a "first computer") to browse a website maintained by an online retailer (i.e., the resource provider computer 104). The user may select a number of items from an electronic catalog maintained by the online retailer for purchase. Once the user has completed his or her selection, the user may be provided with a checkout web page. The checkout webpage may include an option to complete the transaction using a mobile device identifier. For example, the checkout page may include a text input field configured to accept a phone number for the user. The phone number provided in the text input field may be conveyed to the online retailer. In other embodiments, a different type of device identifier such as a device serial number, IP address, or other type of identifier may be used instead of or in addition to the phone number.

Upon receiving the phone number via the checkout page, the resource provider computer 106 may forward the phone number to a service provider computer 106. In some embodiments, the resource provider computer 106 may generate an authorization request message including the phone number. The phone number may be present in a data field normally reserved for a primary account number for a credit or debit card. In some cases, the phone number may be padded with characters to fill in the data field. The service provider computer 106 may then generate a message (e.g., a short messaging service (SMS) message) to be transmitted to the mobile device 110 associated with that phone number. The message may include a number of transaction details associated with the transaction to be completed. Once the message has been received at the mobile device 110, the mobile device 110 may be caused to display a notification to the user that includes at least a portion of the transaction details. The user may also be asked to select a token application installed on the mobile device 102 to complete the transaction. In this example, the token application may be a token application that generates or otherwise obtains (e.g., from a remote server) payment tokens for use in completing transactions. Once selected, the token application may be executed and provided details of the transaction. The token application may then generate a token, which may then be relayed to the service provider computer 106 by the mobile device 102. The service provider computer 106 may then link the generated token to the mobile device identifier, and possibly to a real account identifier stored at the processing network 114. In other embodiments, the mobile device 102 may simply provide a token that was previously stored by the mobile device 106, and obtained by the processing network 114, to the service provider computer 106.

In the case where the token is generated by the mobile device 102, the processing network 114 and/or the authorizing computer may need to link the generated token with a real account identifier. In some embodiments, the software on the mobile device 102 and the software in the processing network 114 and/or authorizing computer may be in synchronization and both computers may generate tokens for use and verification based upon common variable data elements such as the time, date, transaction amount, a counter, etc., and optionally with one or more static data elements such as a real account identifier, device identifier, etc. In other embodiments, the token that is generated by the mobile device 102 may be transmitted to the processing network 114 or the authorization computer 116 outside of the communication path occupied by the transport computer 108 (i.e., out of band, such as through a cellular network).

Once the payment token has been received at the service provider computer 106, the service provider computer 106 may relay that payment token to the resource provider computer 104 operated by online retailer so that it may generate and transmit an authorization request message to an authorizing computer 116 via the transport computer 108 and the processing network 114. The resource provider computer 104 operated by the online retailer may store the payment token that is received and/or use the payment token to complete the transaction as described above. In other embodiments, the service provider computer 106 need not transmit the token back to the resource provider computer 104, but may replace the phone number in the authorization request message with the token, and may then subsequently forward the authorization request message on to the authorizing computer 116 via the transport computer 108 and/or the processing network 114.

If the token is received by either the service provider computer 105, the processing network 114 or the authorizing computer, it may be converted into a real account identifier associated with that token. For example, the processing network 114 may receive an authorization request message including the token from the service provider computer 106 and/or the transport computer 108. Upon receiving the authorization request message with the token, the token may be replace with a real account identifier. The authorization request message may be further modified to replace the token with the real account identifier, and this modified authorization request message may be transmitted to the authorizing computer for authorization. The authorization response message from the authorizing computer may include the real account number, and the processing network 114 may substitute the real account number with the token before transmitting the authorization response message back to the resource provider computer 104.

In some embodiments, the payment token may be a limited-use payment token which may only be used for transactions meeting predetermined criteria (e.g., the specific transaction for which the token has been generated, the particular resource provider for which the token has been generated, a type of the transaction for which the token has been generated, etc.). That is, the service provider computer 106 and/or the authorizing computer may contain the criteria for which the token might be valid. These computers may compare the transaction details with the criteria, and may take the appropriate action. For example, if the criteria is that no transaction using the token can exceed $100, then if the transaction amount in the authorization request message is $110, then the transaction may be rejected because the criteria for the token was not satisfied. In this illustrative example, it should be noted that the online retailer operating the resource provider computer 104 is never provided with a primary account number (PAN) or other sensitive information. Accordingly, the transaction is more secure than other transactions conducted with an online retailer in which a third party (e.g., the online retailer or another entity) is able to obtain and exploit sensitive information. Further, because the token used to conduct the transaction was obtained from a personal device operated by an authentic user, the retrieval of the token from an authentic user device is another authentication factor indicating that the transaction being conducted is authentic.

For clarity, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications protocol.

Figure 2:
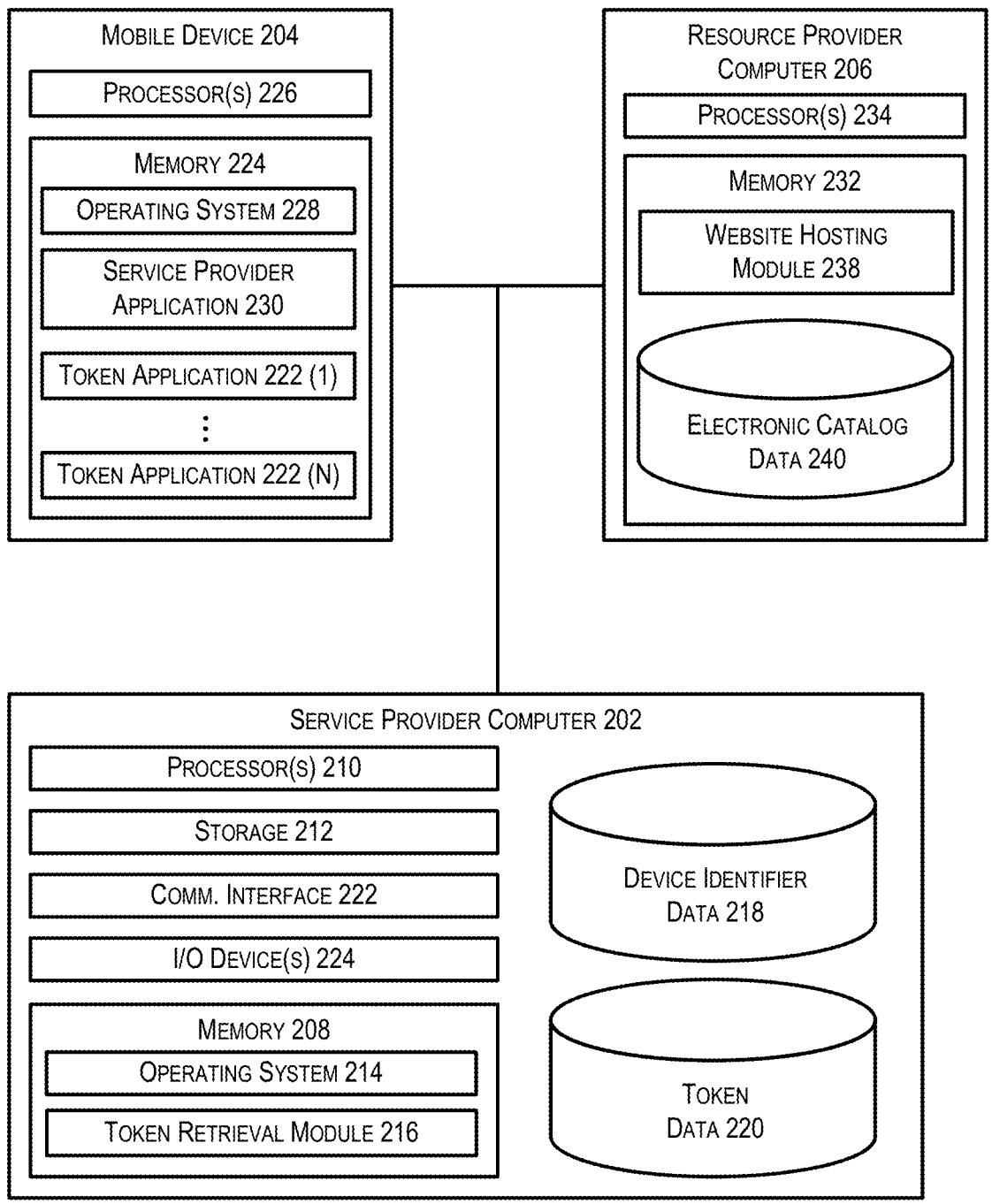
FIG. 2 depicts an example system architecture in which a service provider is configured to communicate with mobile devices and resource providers in order to conduct secure remote payments.

FIG. 2 depicts an example system architecture in which a service provider is configured to communicate with mobile devices and resource providers in order to conduct secure remote payments. Depicted in FIG. 2 is a service provider computer 202 in communication with a mobile device 204 and a resource provider computer 206.

The service provider computer 202 may be an example of service provider computer 106 as depicted in FIG. 1. In at least some embodiments, the service provider computer 202 may include at least one memory 208 and one or more processing units (or processor(s)) 210. The processor(s) 210 may be implemented as appropriate in hardware, computer-executable instructions, firmware or combinations thereof. Computer-executable instruction or firmware embodiments of the processor(s) 210 may include computer-executable or machine executable instructions written in any suitable programming language to perform the various functions described.

The memory 208 may store program instructions that are loadable and executable on the processor(s) 210, as well as data generated during the execution of these programs. Depending on the configuration and type of service provider computer 202, the memory 208 may be volatile (such as random access memory (RAM)) and/or non-volatile (such as read-only memory (ROM), flash memory, etc.). The service provider computer 202 may also include additional storage 212, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the service provider computer 202. In some embodiments, the memory 208 may include multiple different types of memory, such as static random access memory (SRAM), dynamic random access memory (DRAM) or ROM.

Turning to the contents of the memory 208 in more detail, the memory 208 may include an operating system 214 and one or more application programs or services for implementing the features disclosed herein including at least a module for communicating with mobile devices 204 and obtaining token information (token retrieval module 216). The memory 208 may also include device identifier data 218, which includes information on mappings between mobile devices and user accounts and/or token data 220, which includes information on tokens associated with various user accounts and/or resource providers.

In some embodiments, the token retrieval module 216 may, in conjunction with the processor 210, be configured to receive a request from the resource provider computer 206 with respect to a transaction to be completed. The request may include a number of details related to the transaction as well as a mobile device identifier. Upon receiving this request, the token retrieval module 216 may, in conjunction with the processor 210, identify the mobile device identifier (e.g., a phone number) included in the request. In some embodiments, the token retrieval module 216 may, in conjunction with the processor 210, map the mobile device identifier to a user account (e.g., by querying the device identifier data 218). It is envisioned that implementations of this disclosure may provide users with the ability to anonymously transact with a resource provider (e.g., to complete a transaction without providing any identifying information other than a phone number or other non-sensitive device identifier).

The token retrieval module 216 may be configured to, in conjunction with the processor 210, generate a message to be transmitted to the mobile device 204 that includes details related to the transaction to be completed. For example, the message may be generated to include a name of the resource provider, a list of goods and/or services related to the transaction, a price, a date, or any other suitable information. The message may be caused to be displayed on a display of the mobile device 204. In some embodiments, the user may be given the ability to select from a number of token applications 222 on the mobile device 204 to complete the transaction. Once a user has selected a token application 222 to be used in completing the transaction, the mobile device 204 may be caused to execute that token application 222. For example, the token retrieval module 216 may include computer-executable instructions to cause a token application to execute. In this example, the service provider computer 202 may maintain a library of APIs that include routines for interacting with particular token applications 222. Once a token application 222 has been selected by a user, the mobile device 204 may transmit a token generated by that token application 222 to the service provider computer 202. In some embodiments, the service provider computer 202 may store an indication of that token in token data 220. Once the token has been received, the token retrieval module 216 may relay that token to the resource provider computer 206 in response to the received request. This process is described in greater detail below with respect to FIG. 4.

The service provider computer 202 may also contain communications interface(s) 222 that enable the service provider computer 202 to communicate with a stored database, another computing device or server, one or more remote devices, other application servers, and/or any other suitable electronic devices. In some embodiments, the communication interface 222 may enable the service provider computer 202 to communicate with other electronic devices on a network (e.g., on a private network). The service provider computer 202 may also include input/output (I/O) device(s) and/or ports 224, such as for enabling connection with a keyboard, a mouse, a pen, a voice input device, a touch input device, a display, speakers, a printer, etc.

In some embodiments, the mobile device 204 may comprise any portable electronic device capable of communicating with the service provider computer 202. The mobile device 204 may include a memory 224 (e.g., a computer-readable storage medium) storing instructions that, when executed by a processor 226 of the mobile device 204, allow the client device to perform its intended functions. Turning to the contents of the memory 224 in more detail, the memory 224 may include an operating system 228 that provides executable program instructions for the general administration and operation of the mobile device 204, and one or more mobile applications, at least one of which may be configured to cause the mobile device 204 to communicate with the service provider computer 202 in order to receive transaction information from a resource provider computer 206 (e.g., service provider application 230), and at least one of which may be an application configured to generate tokens for use in completing a transaction (e.g., token application 222). In some embodiments, a token application 222 may be referred to as a token application. The memory 224 may include multiple token applications 222 (e.g., 1-N).

A token application 222 may be configured to, in conjunction with a processor 226, generate a token to be used in a transaction. In some embodiments, the token application 222 may authenticate a user of the mobile device 204 before generating a token. To do this, the token application 222 may, in conjunction with the processor 226, obtain biometric information from the user (e.g., a fingerprint or voiceprint) via an input sensor installed on the mobile device 204 to be compared to biometric information stored in relation to the user. Upon verifying that the user is authorized to access the token application 222, the user may be prompted to select a payment option (e.g., a credit card or bank account). The token application 222 may in conjunction with the processor 226, then be configured to generate a token to be mapped to the identified payment option. The token application 222, in conjunction with the processor 226, may transmit the mapping between the payment option and the token to a remote server (e.g., in the processing network 114) that provides backend support for the token application 222. As explained above, in other embodiments, the mobile device 204 need not transmit the token to the remote server.

In some embodiments, a resource provider computer 206 may be an example resource provider computer 104 as depicted in FIG. 1. The resource provider computer 206 may include a memory 232 (e.g., a computer-readable storage medium) storing instructions that, when executed by a processor 234 of the resource provider computer 206, allow the resource provider computer 206 to perform its intended functions. In particular, the memory 232 may include a module for maintaining and serving webpages to one or more client devices that access the resource provider computer 206 via an internet connection (e.g., website hosting module 238). In some embodiments, the resource provider computer 206 may maintain an electronic catalog 240 that includes a set of goods and/or services offered by that resource provider. The resource provider may be configured to enable a user of a website hosted by the resource provider to conduct a transaction for a product (e.g., a good or service) maintained in the electronic catalog 240. The resource provider computer 206 may also comprise an authorization module that may be programmed to cause the resource provider computer 206 to generate authorization request messages, and receive authorization response messages.

Figure 3:
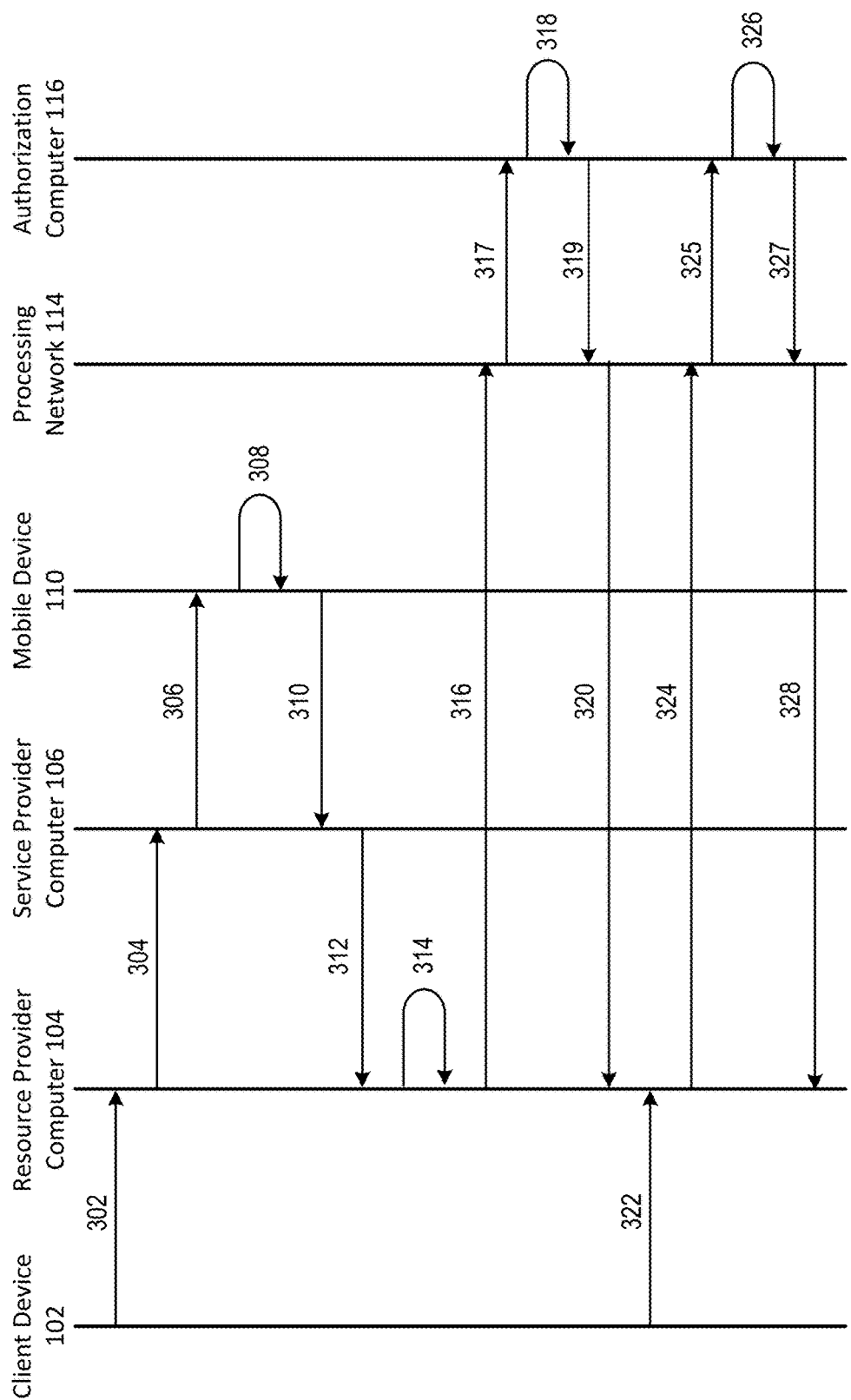
FIG. 3 depicts a swim lane diagram depicting a process for receiving a mobile device identifier and conducting a secure remote transaction in accordance with at least some embodiments.

FIG. 3 depicts a swim lane diagram depicting a process for receiving a mobile device identifier and conducting a secure remote transaction in accordance with at least some embodiments. The process 300 illustrates potential interactions between various components described with respect to FIG. 1 above. For example, depicted in process 300 is a client device 102 (which may be an example of the client device 102 depicted in FIG. 1), a resource provider computer 104 (which may be an example of the resource provider computer 104 depicted in FIG. 1), a service provider computer 106 (which may be an example of the service provider computer 106 depicted in FIG. 1), a mobile device 110 (which may be an example of the mobile device 110 depicted in FIG. 1), and a processing network 114 (which may be an example of the processing network 114 depicted in FIG. 1). The processing network 114 may be configured to route authorization request messages to an authorization computer 116 (which may be an example of the authorization computer 116 depicted in FIG. 1).

In accordance with at least some embodiments, a user of the client device 102 may initiate the process 300 at 302 by accessing a resource provider computer 104 and generating a request for a good or service. In some embodiments, a user may use the client device 102 to access a webpage maintained by the resource provider computer 104. The user may select a number of resources to purchase from the resource provider computer 104 via the webpage and may initiate a transaction to purchase the selected resources using a checkout button. When initiating the transaction, the user may provide a mobile device identifier (e.g., a phone number) in a text input field of the webpage.

At 304, the resource provider computer 104 may generate a transaction request that includes a number of transaction details related to the submitted transaction and may transmit that transaction request to the service provider computer 106. In particular, the transaction request may include at least the mobile device identifier provided by the user, an amount of the transaction, and indication of at least one resource involved in the transaction, and/or any other transaction-related information. In some embodiments, the transaction request may be an authorization request message.

At 306, the service provider computer 106, upon receiving the transaction request, may identify the mobile device identifier within the transaction request. In some embodiments, the service provider computer 106 may determine whether the mobile device identifier is associated with a user account maintained by the service provider computer 106, and if so, may identify relevant account-related information to be appended to the transaction request. For example, the service provider computer 106 may determine a name of the user to be appended to the transaction request. The service provider computer 106 may send at least a portion of the information received in the transaction request to the mobile device 110. For example, the service provider computer 106 may generate a short messaging service (SMS) message to be transmitted to the mobile device 110 that includes the name of the resource provider as well as an amount associated with the transaction.

At 308, upon receiving the transaction information, the mobile device 110 may identify one or more token applications installed on the mobile device 110 that may be used to complete the transaction. A list including the one or more token applications installed on the mobile device 110 may then be displayed to a user of the mobile device along with the transaction information received from the service provider. For example, the mobile device 110 may receive the transaction information via an SMS message. Upon opening the SMS message, the user of the mobile device 110 may be asked to confirm that they wish to complete the transaction associated with the transaction information. Upon receiving an indication from the user that they wish to complete the transaction, the mobile device 110 may be caused to display the list of token applications as possible means for completing the transaction. Upon selection of a particular token application from the list of token applications by a user, the token application may be initiated on the mobile device and may subsequently generate or retrieve (e.g., from a remote server) a token to be used in the transaction (e.g., a first token). Alternatively, the token may have been previously received by the mobile device 308 and need not be generated per transaction by the mobile device 308. This token may be provided to the service provider computer 106 at 310.

In some embodiments, the service provider computer 106 may relay the token to the resource provider computer 104 at 312. The resource provider computer 104, upon receiving the token, may then initiate the requested transaction using the received token at 314. In some embodiments, the token may be used to complete the transaction absent any other sensitive information associated with the user. In some embodiments, the resource provider computer 104 may subsequently store the received token for use in future transactions. To initiate the transaction, the resource provider computer 104 may generate an authorization request message using the received token information.

In some embodiments, the service provider computer 106 may initiate the transaction on behalf of the resource provider computer 104 by generating the authorization request message and submitting the generated authorization request message to the processing network 114. In these embodiments, the service provider computer 106 may store the token received from the mobile device 110 and may generate the authorization request message to include that token. In at least some of these embodiments, the service provider 106 may only respond to the resource provider computer 104 once the transaction has been approved or declined (e.g., the service provider 106 receives an authorization response message).

At 316, the authorization request message may be submitted to the processing network 114. Upon receiving the authorization request message, the processing network 114 may route the authorization request message to an authorization entity computer (e.g., an issuer) associated with the token at 317. In some embodiments, the processing network 114 may utilize a token service associated with the token to identify a primary account number (PAN) to be used to complete the transaction and the authorization request message may be routed to an authorization entity computer associated with that PAN. The authorization entity computer may then determine whether the transaction is approved or declined at 318. For example, the authorization entity computer may determine whether there are sufficient funds associated with the account to complete the transaction. Upon determining whether the transaction should be approved or declined, the authorization entity computer may subsequently generate an authorization response message that includes an indication of whether the transaction is approved or declined and return that authorization response message to the processing network 114 at 319. The authorization response message may then be routed back to the resource provider computer 104 or the service provider computer 106 (depending on which computer submitted the authorization request message) at 320. The processing network 114 may replace the PAN with the token in the authorization response message if a PAN was received in the authorization response message from the authorization computer.

Upon receiving the authorization response message, the resource provider computer 104 may complete the requested transaction. For example, if the transaction has been approved, then the resource provider computer 104 may initiate a fulfillment process for the item (e.g., by shipping the resources to an address provided by the user).

At the end of the day or at any other suitable time, the processing network 114, the authorization computer, and the transport computer (not shown in FIG. 3) associated with the resource provider computer may particulate in a clearing and settlement process.

At 322, the resource provider computer 104 may receive a second request for a transaction from the client device that includes an indication of the same mobile device number. Upon receiving this second request, the resource provider computer 104 may, upon determining that the stored token information is not expired, utilize the stored token information at the resource provider computer 104 to complete a second transaction. Similar to the first transaction, the resource provider computer 104 may generate an authorization request message using the received token information (e.g., the first token). In some embodiments, a second token may be generated from the stored token, which is subsequently used in the transaction. For example, the second token may be generated from a stored token by using some function that involves a transaction counter or any other suitable dynamic element.

At 324, the authorization request message may be submitted to the processing network 114, directly or via a transport computer, which may be subsequently routed to an appropriate authorization entity computer at 325. Prior to routing the authorization request message to the authorization entity computer, the token may be replaced with a real account identifier in the authorization request message. The authorization entity computer may then determine whether the transaction is approved or declined at 326, and may transmit an authorization response message back to the processing network 114 at 327. The authorization response message may then be routed back to the resource provider computer 104 at 328. Prior to sending the authorization response message back to the resource provider computer 104, the processing network 114 may replace the real account identifier with the token.

Figure 4:
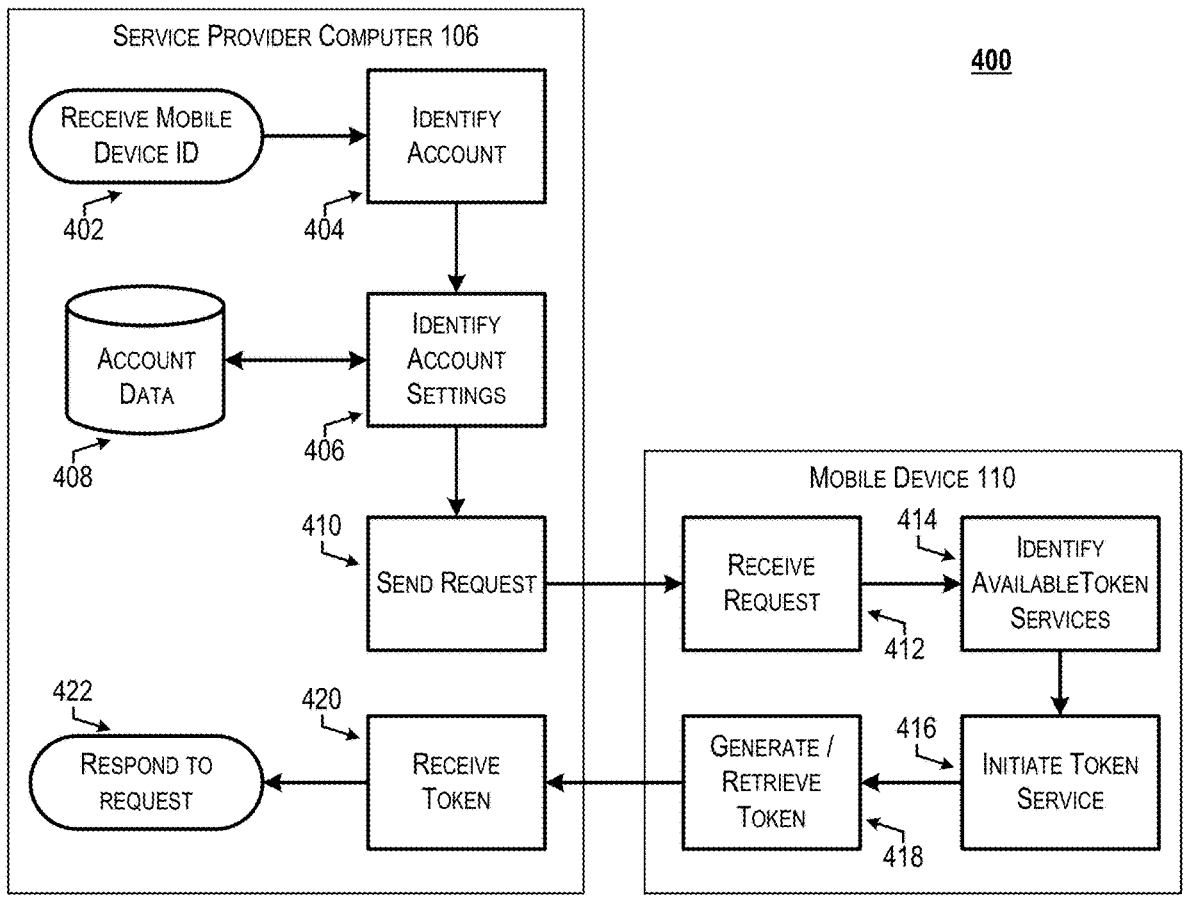
FIG. 4 depicts a flow chart illustrating a process for conducting a secure mobile transaction in accordance with at least some embodiments.

FIG. 4 depicts a flow chart illustrating a process for conducting a secure mobile transaction in accordance with at least some embodiments. In FIG. 4, a service provider computer 106 (e.g., an example service provider computer 106 as depicted in FIG. 1) may be in communication with a mobile device 110 (e.g., an example mobile device 110 as depicted in FIG. 1).

Process 400 may begin at 402, when information related to a transaction is received from a resource provider. The transaction information may include at least a mobile device identifier. Upon receiving the transaction information, the service provider computer may identify a user account associated with the mobile device identifier at 404.

In some embodiments, the service provider computer 106 may identify account settings associated with the user account at 406. For example, the service provider computer 106 may identify a method of communicating with the mobile device 110 stored as account settings within account data 408. Upon identifying an appropriate method of communication, the service provider computer 106 may send a request to the mobile device 110 at 410.

Upon receiving the request at 412, the mobile device 110 may identify a number of token applications installed on the mobile device 110 that may be used to complete the transaction at 414. In some embodiments, the number of token applications may be identified using a discovery process initiated by a mobile application installed on the mobile device 110. The number of token applications may be displayed on a display of the mobile device 110.

In some embodiments, the mobile device 110 may receive an indication from the user that the transaction is to be completed using a particular token application of the number of mobile applications installed on the mobile device 110. Upon receiving this indication, an instance of the first token application may be instantiated in memory of the mobile device 110 at 416. Once instantiated, a graphical user interface (GUI) associated with the first token application may authenticate the user of the mobile device 110 in accordance with processes implemented by that token application. In this embodiment, the token application may be characterized as an "authentication application," since it is used to authenticate the user of the mobile device 110. In some embodiments, this may require that the user provide login information or biometric information.

Once the user has been authenticated, the token application may cause the mobile device 110 to communicate details of the transaction to a remote token application computer. In some embodiments, the remote token application computer may pre-authorize the transaction based on the transaction details and/or data associated with the account maintained with respect to a user. For example, the token application computer may have determined that the mobile device 110 has not been associated with any fraud or technical problems. In some embodiments, the token application computer may respond to the transaction details by providing a token to be used to complete the transaction. In other embodiments, the token application may generate or retrieve a token to be used to complete the transaction on the mobile device 110 at 418. In some embodiments, the token may be generated on the mobile device 110 itself. The token may then be conveyed to an authorization entity associated with the token application so that the authorization entity is able to map that token to the transaction or account number. In some embodiments, the token may be generated on, or retrieved from, a remote server. In these embodiments, the token application on the mobile device 110 may communicate with the remote server to request a token to be used in the transaction. The remote server may then generate an appropriate token or retrieve a token from its token vault that is not currently mapped to an account. In some embodiments, the token may be a limited-use token. For example, the token may be generated such that it may only be used by a particular resource provider, a specified number of times, under specific transaction conditions, or any other suitable transaction limitation.

Once the token has been generated by the mobile device 110, it may be transmitted to the service provider computer 106 at 420. In some embodiments, once received, the service provider computer 106 may relay the token to the resource provider computer from which the transaction information was received at 422. In some embodiments, the service provider computer 106 may obtain authorization for the transaction using the received token via a processing network and may respond to the resource provider computer 104 with an indication as to whether the transaction should be approved or declined. In these embodiments, the service provider computer 106 may store the token for future use. For example, the first time that a user elects to use a mobile payment option with a resource provider, the user may be asked to generate a token on his or her mobile device. The second time that the user elects to use the mobile payment option with that resource provider, the user may be asked to confirm the transaction via the mobile device, but may not be asked to generate another token.

Figure 5:
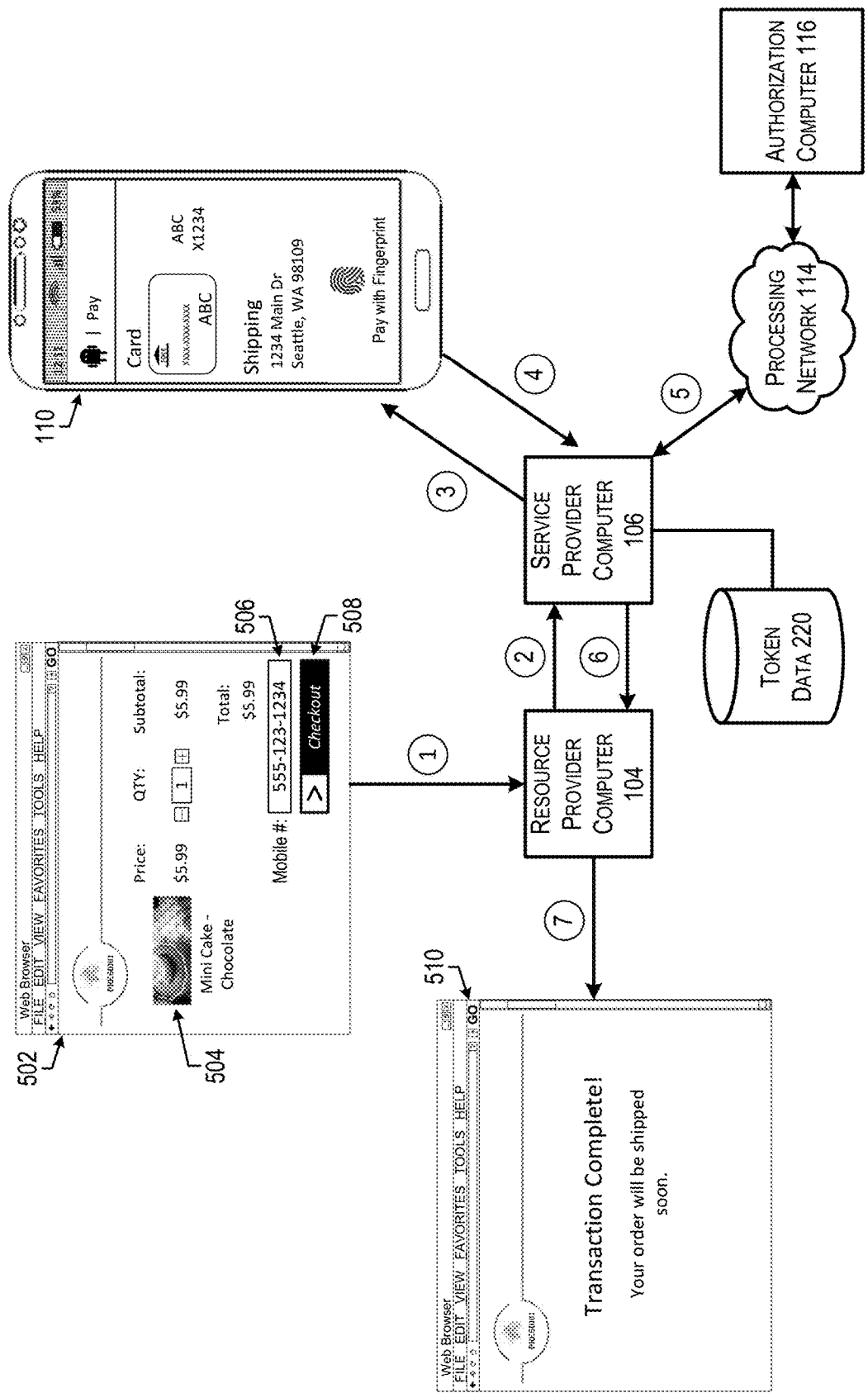
FIG. 5 depicts an example interaction that may be conducted by a user in accordance with at least some embodiments.

FIG. 5 depicts an example interaction that may be conducted by a user in accordance with at least some embodiments. In FIG. 5, a user may interact with a webpage 502 which may be accessed on a client device in accordance with a web browser application. The webpage 502 may be maintained/operated by a resource provider computer 104 (e.g., an online retailer). For example, the webpage 502 may be an electronic retailer's webpage.

In accordance with at least some embodiments, the user may select an item 504 to be purchased from the resource provider and proceed to a checkout page. The checkout page may include a mobile number payment option 506 which includes a text input field. The text input field may be configured to enable a user to input a mobile device identifier in order to complete a transaction for the selected item 504. Upon entering a mobile device identifier into the text input field, the user may select a checkout button 508.

At step 1, information related to the transaction as well as the mobile device identifier may be transmitted to the resource provider computer 104 that maintains the webpage 502. Upon determining that the user has selected to complete the transaction using a mobile number payment option 506, the resource provider computer 104 may relay the mobile device identifier to a service provider computer 106 at step 2.

The service provider computer 106 may receive the mobile device identifier and transaction information from the resource provider computer 104. The service provider computer 106 may identify the received mobile device identifier. The service provider computer 106 may generate a transaction request message to be provided to the mobile device 110 via the mobile device identifier at step 3.

Upon receiving the transaction information, the user of the mobile device 110 may be prompted to confirm the transaction. Upon confirming the transaction, the user may be prompted to select a payment option on the mobile device. For example, the mobile device 110 may compile a list of payment options available to the user and the user may be provided the ability to select from that list of payment options. Payment options may include token applications installed on the mobile device 110 capable of generating a payment token. Once the user has selected a token application from the list of payment options, the user may be authenticated using the selected token application. For example, the selected token application may be executed and provided with the received transaction information. Upon its execution, the selected token application may obtain biometric or other login information from the user. Once authenticated, the token application may generate or provide a token based on the received transaction information.

At step 4, the token generated or provided by the selected token application may be conveyed to the service provider computer 106. In some embodiments, the service provider computer 106 may store the received token in token data 220 (which may be an example of token data 220 as depicted in FIG. 2). The token may be stored in relation to one or more use criteria. For example, the service provider computer 106 may store an indication that the stored token should only be used in relation to the resource provider associated with resource provider computer 104. In some embodiments, the service provider computer may relay the token to the resource provider computer 104 so that the resource provider computer 104 may complete a transaction using the token. In some embodiments, the service provider computer 106 may generate an authorization request message to gain authorization for the transaction. The authorization request message may be submitted to a processing network 114 at step 5, which may route it to an authorization computer 116. Additional payment processing steps involving the authorization entity computer are described above, and can be incorporated here, and need not be repeated here.

The service provider computer 106 may respond to the resource provider computer 104 at step 6. In some embodiments, this response may be made upon receiving an authorization response message from the processing network 114 indicating a status of the transaction. If the response indicates that the transaction is authorized, the resource provider computer 104 may initiate a fulfillment process for the transaction (e.g., the resource provider may prepare a purchased item for shipment). Once the transaction has been completed, the resource provider computer 104 may serve a confirmation page 510 to the client device.

It should be noted that the user's shipping address or other fulfillment information (if needed) may be provided to the resource provider computer 104 by the user (e.g., via the webpage 502) or that information may be provided to the resource provider computer 104 by the service provider computer 106 at step 6. For example, the service provider computer 106 may store default shipping information for the user with respect to his or her account. Upon receiving an indication that the transaction has been authorized, the service provider computer 106 may retrieve that default shipping information from a data store and forward it to the resource provider computer 104. In some embodiments, the user may be asked to provide a shipping address via the mobile device 110 (e.g., by selecting from available shipping addresses).

Figure 6:
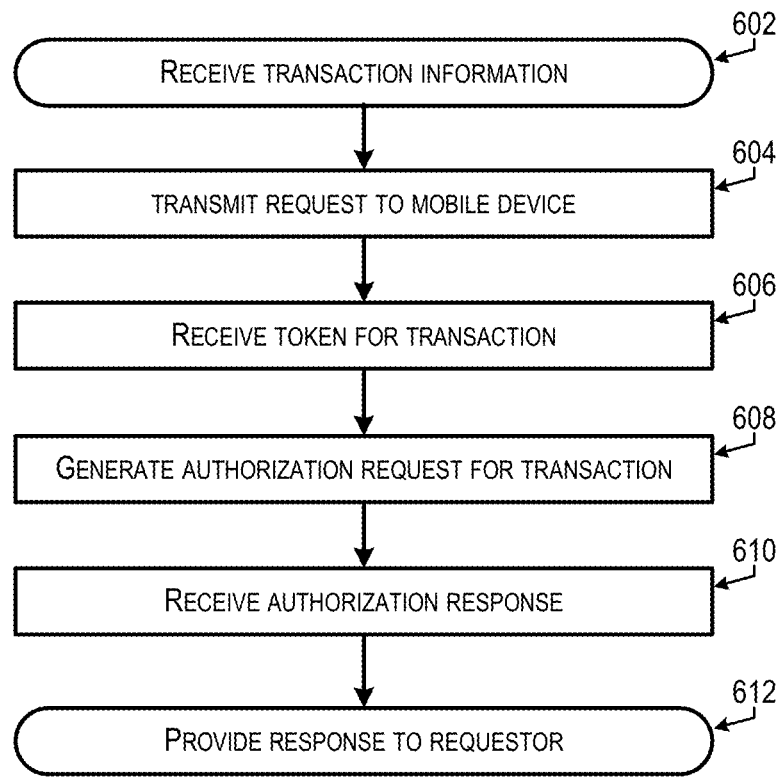
FIG. 6 depicts a flow diagram illustrating a process for conducting a remote transaction in accordance with at least some embodiments.
Figure 6:
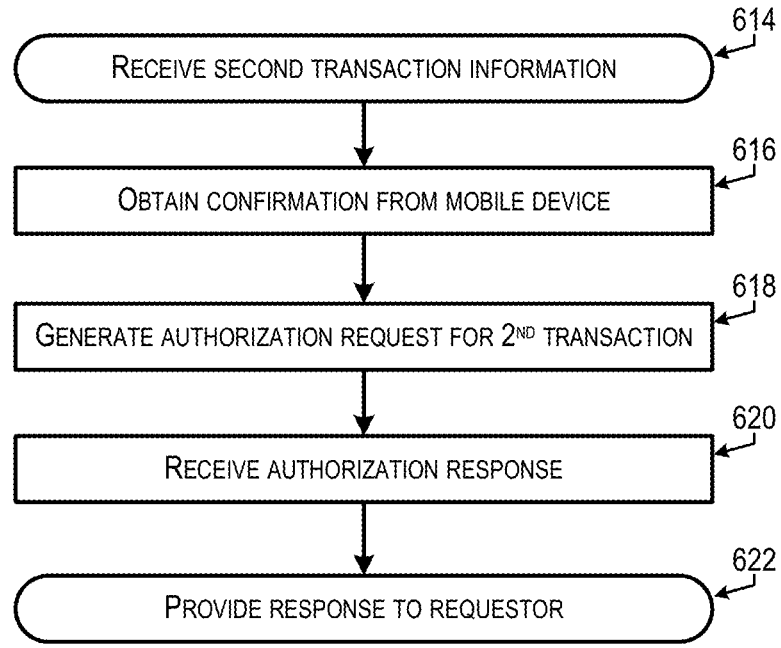

FIG. 6 depicts a flow diagram illustrating a process for conducting a remote transaction in accordance with at least some embodiments. In at least some embodiments, process 600 may be performed by a service provider computer 106 as depicted in FIG. 1.

Process 600 may begin at 602, when transaction information is received from a resource provider in a request to complete a transaction. The transaction information may include at least a mobile device identifier that can be used to identify a particular mobile device. The service provider computer may, upon receiving this information, identify the mobile device identifier from the transaction information as well as the resource provider. In some embodiments, the service provider may determine whether the identified particular resource provider has previously conducted a transaction using the identified mobile device identifier. If such a previous transaction has been conducted, then the service provider may retrieve a token stored in relation to the resource provider and mobile device identifier. If the retrieved token has expired (e.g., one or more conditions associated with the use of the token has been exceeded), then the service provider computer may continue with process 600 as if the transaction is the first that involves the resource provider and the mobile device identifier. If the retrieved token is still valid, then the service provider computer may proceed to step 616 of process 600 described below. In some embodiments, the user may have an account with the service provider which is associated with the mobile device identifier. In other embodiments, the user need not have an account with the service provider and may remain anonymous, even to the service provider.

At 604, the service provider computer may transmit a request for a token to the mobile device associated with the mobile device identifier. The request may include a number of details related to the requested transaction. For example, the service provider computer may generate an SMS message that includes a name of a merchant (i.e., the resource provider), an indication of at least one item for which the transaction is to be conducted, an amount of the transaction, and any other relevant transaction details. The generated SMS message may be transmitted to the mobile device via a cellular network connection.

At 606, the service provider computer may receive a response from the mobile device that includes a token to be used in the transaction. The token may be generated on the mobile device using a token application installed on that mobile device, or simply provided by the mobile device. Upon receiving the token, the service provider may subsequently store the received token in relation to the mobile device identifier and the resource provider.

At 608, the service provider computer may generate an authorization request message to obtain authorization for the transaction using the token received from the mobile device. The generated authorization request message may be submitted to a transaction processing network to be routed to an authorization entity (e.g., an issuer or token service provider). The service provider computer may the receive an authorization response message for the transaction at 610 via the transaction processing network. Additional steps involving the authorization entity computer are described above, and can be incorporated here, and need not be repeated here.

At 612, the service provider computer may provide a response to the requestor (i.e., the resource provider). The response may include an indication of whether the transaction has been approved or declined. The requestor may decide whether to complete the transaction based on that received response.

At 614, the service provider computer may receive a second request including information for a second transaction. The service provider computer may, upon receiving this information, identify the mobile device identifier from the transaction information as well as the resource provider. Because the service provider already has a stored token associated with the resource provider and mobile device identifier, the service provider may retrieve that token. If the retrieved token has expired (e.g., one or more conditions associated with the use of the token has been exceeded), then the service provider computer may repeat steps 604 through 606 to obtain a replacement token. If the retrieved token is still valid, then the service provider computer may proceed with process 600.

In some embodiments, the service provider computer may obtain confirmation that the user wishes to complete the transaction at 616. For example, the service provider computer may generate an SMS message, or any other suitable notification, that includes information related to the transaction. The user may be asked to elect whether he or she wishes to proceed. In these embodiments, the process may only proceed upon obtaining confirmation from the user. It should be noted that in some embodiments of process 600, this step may be omitted. For example, the service provider computer, upon determining that the token is valid, may proceed directly to step 618 without obtaining confirmation from the user that he or she wishes to complete the second transaction.

At 618, the service provider computer may generate an authorization request message to obtain authorization for the second transaction using the retrieved token. The generated authorization request message may be submitted to a transaction processing network to be routed to an authorization entity (e.g., an issuer or token service provider). The service provider computer may the receive an authorization response message for the transaction at 620 via the transaction processing network.

At 622, the service provider computer may provide a response to the requestor (i.e., the resource provider). The response may include an indication of whether the second transaction has been approved or declined. The requestor may decide whether to complete the second transaction based on that received response.

Embodiments of the invention provide for a number of technical advantages over conventional systems. For example, embodiments of the invention enable transactions that are relatively anonymous (e.g., do not require sensitive information or user identifiers) while remaining secure (e.g., by limiting risk to the parties of the transaction). To conduct such a transaction, the user need only enter a mobile phone identifier and the user will subsequently be contacted via his or her mobile device. Upon receiving this communication, the user is free to choose any token service (e.g., electronic wallet application) installed on his or her device to complete the transaction, even if the resource provider does not typically accept that token service. This allows for significantly more flexibility on the part of the user than conventional systems.

Additionally, because the user is authenticated in accordance with procedures implemented by the token service, the user's authenticity is assured by that token service. Hence, even though the merchant may not be able to authenticate the user, liability may be shifted to the token service. Furthermore, in future transactions conducted with the same resource provider, the user need only confirm that he or she initiated the transaction and the transaction can be quickly completed.

Still further, the token that is used to conduct a transaction can only be located within a particular device (e.g., a phone) operated by a user. Each of the user's devices need not receive or store the token. Consequently, the system provides for better data security than conventional systems, since information that can actually be used to conduct a payment transaction needs to be stored on only one device operated by the user. Further, the retrieval of the token from that one device (e.g., the user's phone can serve as an authentication factor, thus providing assurance to an authorizing entity such as an issuer that the transaction being conducted is authentic. Note that in some embodiments, after receiving the token from the user's device, the service provider may provide an indicator in the authorization request message indicating that the token was successfully retrieved from the user's mobile device. This indicator may be used by the authorizing entity or a processing network in a fraud analysis for the transaction. It can be used to differentiate transactions where a token or account number was provided in an authorization request message directly to a resource providing entity computer at the point of transaction.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, at a service provider computer from a resource provider via a first communication channel, a first transaction request comprising a number of details including data related to a first transaction and a device identifier associated with a second user device that was provided to the resource provider via a user interface displayed on first user device;
transmitting, by the service provider computer, a request to the second user device using the device identifier via a second communication channel different from the first communication channel, for a first token, the request including the number of details related to the first transaction received from the resource provider;
receiving, from the second user device by the service provider computer, the first token, wherein the first token is a token that is generated or retrieved by a token application installed on the second user device, wherein the token application is caused to authenticate a user of the second user device;

generating, by the service provider computer on behalf of the resource provider, an authorization request message comprising the first token received from the second user device in connection with the first transaction between the first user device and the resource provider;

transmitting, by the service provider computer, the authorization request message comprising the first token to an authorization computer for authorization in the first transaction, such that the resource provider is not provided with the first token;

storing, by the service provider computer, the first token in association with the resource provider and one or more use criteria;

receiving, by the service provider computer from the resource provider, a second transaction request including the device identifier in a second transaction after the first transaction;

upon receiving the second transaction request, transmitting, by the service provider computer, a message to the second user device to confirm the second transaction;

upon receiving a confirmation from the second user device, determining, by the service provider computer, a validity of the first token based on whether the one or more use criteria associated with the first token have been exceeded;

upon determining that the first token is not valid, obtaining, by the service provider computer, a second token, wherein the second token is generated from the first token using a function based on the first token and a transaction counter, wherein the first token and the second token are substitute values for a primary account number identifying a same account of the user; and transmitting, by the service provider computer, a second authorization request message comprising the second token related to the first token to the authorization computer for authorization of the second transaction.

2. The method of claim 1, wherein the first user device is a personal computer and the user second device is a mobile device.

3. The method of claim 1, wherein the device identifier is a phone number.

4. The method of claim 1, wherein the first token, the second token, and the primary account number each have 16 digits.

5. The method of claim 1, wherein the request for the first token is transmitted to the second user device in form of a short messaging service (SMS) message.

6. The method of claim 1, wherein the number of details further include one or more of an identifier for the resource provider, an amount of the first transaction or an indication of an item for which the first transaction is to be conducted.

7. The method of claim 1, wherein the first transaction is an electronic transaction.

8. The method of claim 1, wherein the device identifier for the second user device is provided in a field of the first transaction request that is reserved for an account identifier of the account of the user to be used in the first transaction.

9. The method of claim 1, wherein the first transaction is an electronic transaction performed on a website maintained by the resource provider.

10. A system comprising:
a processor; and a memory including instructions that, when executed with the processor, cause the system to, at least:

receive, from a resource provider via a first communication channel, a first transaction request comprising a number of details including data related to a first transaction and a device identifier associated with a second user device that was provided to the resource provider via a user interface displayed on first user device;

transmit a request to the second user device using the device identifier via a second communication channel different from the first communication channel, for a first access token, the request including the number of details related to the first transaction received from the resource provider;

receive, from the second user device, the first access token, wherein the first access token is a token that is generated or retrieved by a token application installed on the second user device, wherein the token application is caused to authenticate a user of the second user device;

generate, on behalf of the resource provider, a first authorization request message comprising the first access token received from the second user device in connection with the first transaction between the first user device and the resource provider;

transmit the first authorization request message comprising the first access token to an authorization computer for authorization in the first transaction such that the resource provider is not provided with the first access token;

store, within the memory, the first access token in association with the resource provider and one or more use criteria;

receive, from the resource provider, a second transaction request including the device identifier in a second transaction after the first transaction;

upon receiving the second transaction request, transmit a message to the second user device to confirm the second transaction;

upon receiving a confirmation from the second user device, determine a validity of the first access token based on whether the one or more use criteria associated with the first access token have been exceeded; and upon determining that the first access token is not valid, obtain a second token, wherein the second token is generated from the first access token using a function based on the first access token and a transaction counter, wherein the first access token and the second token are substitute values for a primary account number identifying a same account of the user; and transmit a second authorization request message comprising the second token to the authorization computer for authorization of the second transaction.

11. The system of claim 10, wherein the request transmitted to the second user device causes at least one token application to be displayed on the second user device.

12. The system of claim 11, wherein the request transmitted to the second user device causes an instance of a token application selected from the at least one token application to be opened.

13. The system of claim 12, wherein the instance of the token application is initiated with details of the first transaction.

14. A mobile device comprising:
a display;

a processor; and a memory including instructions that, when executed with the processor, cause the mobile device to, at least:

receive, from a service provider computer, transaction information including data related to a first transaction initiated via a client device and account identifying data, the first transaction initiated with a resource provider via the client device;

identify a number of token applications installed on the mobile device capable of being used in the first transaction;

display the number of token applications on a user interface displayed on the display;

receive, via the user interface displayed on the display, an indication of an individual token application of the number of token applications to be used in the first transaction;

execute the individual token application in the memory, the individual token application being provided with the transaction information upon its execution;

receive a first token from the individual token application, wherein the first token is a token that is generated or retrieved by the individual token application, wherein the individual token application is caused to authenticate a user of the mobile device;

provide the first token to the service provider computer via a first communication channel, wherein the service provider computer is caused to complete the first transaction on behalf of the resource provider over a second communication channel different from the first communication channel using the first token without providing the first token to the resource provider;

receive, from the service provider computer, a second transaction information related to a second transaction initiated with the resource provider after completion of the first transaction;

receive approval to proceed with the second transaction from the user of the mobile device; and upon receiving approval to proceed from the user of the mobile device, cause the service provider computer to complete the second transaction on behalf of the resource provider using a second token, wherein the second token is generated from the first token using a function based on the first token and a transaction counter, wherein the first token and the second token are substitute values for a primary account number identifying a same account of the user.

15. The mobile device of claim 14, wherein the first token is provided to the individual token application by a remote server associated with the individual token application.

16. The mobile device of claim 14, wherein the resource provider fails to support the individual token application or tokens generated by the individual token application.

* * * * *